US012782291B2

(12) United States Patent
Lim

(10) Patent No.: US 12,782,291 B2
(45) **Date of Patent: *Nov. 3, 2026**

(54) DEFECT INSPECTION SYSTEM USING 3D MEASURING MACHINE

(71) Applicant: Young Han Lim, Seoul (KR)

(72) Inventor: Young Han Lim, Seoul (KR)

( * ) Notice: Subject to any disclaimer, the term of this patent is extended or adjusted under 35 U.S.C. 154(b) by 88 days.

This patent is subject to a terminal disclaimer.

(21) Appl. No.: 18/990,370

(22) Filed: Dec. 20, 2024

(65) Prior Publication Data

US 2025/0123216 A1 Apr. 17, 2025

Related U.S. Application Data

(63) Continuation of application No. 18/115,425, filed on Feb. 28, 2023, now Pat. No. 12,235,222.

(30) Foreign Application Priority Data

May 9, 2022 (KR) ........................ 10-2022-0056356

(51) Int. Cl.
*G01N 21/88* (2006.01)
*G06T 7/00* (2017.01)

(52) U.S. Cl.
CPC ..... *G01N 21/8806* (2013.01); *G01N 21/8851* (2013.01); *G06T 7/0004* (2013.01)

(58) Field of Classification Search
CPC ............ G01N 21/8806; G01N 21/8851; G06T 7/0004
See application file for complete search history.

(56) References Cited

U.S. PATENT DOCUMENTS 6,522,777 B1 * 2/2003 Paulsen .............. G01B 11/2513 356/243.1

FOREIGN PATENT DOCUMENTS

| | | |
|---|---|---|
| JP | 2021-047104 | 3/2021 |
| KR | 10-2000-0058836 | 10/2000 |
| KR | 10-1424118 | 8/2014 |
| KR | 10-2015-0011068 | 1/2015 |
| KR | 10-1644815 | 8/2016 |
| KR | 10-1659302 | 9/2016 |

* cited by examiner

*Primary Examiner* — Jamil Ahmed
(74) *Attorney, Agent, or Firm* — KILE PARK REED & HOUTTEMAN PLLC

(57) ABSTRACT

Disclosed herein is a defect inspection system using a three-dimensional (3D) measuring machine, which may include a conveying part disposed between a loading part and an unloading part and configured to hold and transfer a device, a 2D measuring machine provided to face the conveying part and configured to generate a 2D image of the device, a 3D measuring machine provided to face the conveying part in a row with the 2D measuring machine and configured to generate a 3D image of the device, and a processor configured to align and merge the 3D image and the 2D image to generate a device image and configured to determine a defect of the device on the basis of the device image.

3 Claims, 4 Drawing Sheets

DEFECT INSPECTION SYSTEM USING 3D MEASURING MACHINE

CROSS REFERENCE TO RELATED APPLICATION(S)

This is a continuation application of U.S. patent application Ser. No. 18/115,425 filed Feb. 28, 2023 (now pending), the disclosure of which is incorporated herein by reference in its entirety. U.S. patent application Ser. No. 18/115,425 claims priority to and benefits of Korean Patent Application No. 10-2022-0056356 under 35 U.S.C. § 119, filed on May 9, 2022, in the Korean Intellectual Property Office (KIPO), the entire contents of which are incorporated herein by reference.

BACKGROUND

1. Technical Field

The disclosure relates to a defect inspection system using a three-dimensional (3D) measuring machine, and more particularly, to a defect inspection system using a 3D measuring machine, which can perform visual inspection on a device using the 3D measuring machine.

2. Description of the Related Art

Generally, a manufacturing process of devices including semiconductors includes a pre-process and a post-process.

The pre-process is an operation of determining quality of a device, such as in miniaturization technology, and repeatedly performs processes such as exposure, etching, deposition, cleaning, and polishing processes to implement a circuit on a substrate such as a wafer.

In the post-process, a substrate on which circuit patterns are formed is separated into individual device units, an individual device is assembled, the assembled device is commercialized as a final device, and performance and reliability tests are performed. It is necessary to perform visual inspection in which a short circuit or disconnection of a pattern, scratches, cracks, the presence of foreign materials, and damage to a chip are precisely inspected on a device undergoing the post-process before it is assembled into a complete product such as an electronic product.

In case that defects of semiconductors are not identified through the visual inspection, since a problem in which complete products with these defective semiconductors do not operate normally is caused, the visual inspection is very important during the post-process.

In the separate semiconductor technology field, since a performance development method is limited because of simple miniaturization of a semiconductor, a paradigm change is required for realizing a high-integration device which meets a low-power and high-performance driving condition.

Accordingly, integration technologies such as 2.5-dimensional (D) or three-dimensional (3D) stacking are being developed as a way of implementing highly-integrated devices. In performing visual inspection on semiconductors stacked each other, the visual inspection according to the conventional 2D method has a problem of an inaccurate diagnosis of defects such as micro-sized dents, twists, and tears.

In order to compensate the conventional 2D method, the need for 3D visual inspection is emerging. 3D measuring machines that measure measurement targets in a non-contact manner include various types of 3D measuring machines such as a laser-type time of flight (TOF) measuring machine, an optical triangulation measuring machine, and a patterned light-type structured light measuring machine. Each 3D measuring machine has problems of consuming considerable power and having a performance limit in terms of yield, such as a resolution limit depending on performance of hardware constituting each 3D measuring machine.

RELATED ART DOCUMENT (Patent Document 0001) Korean Patent Registration No. 10-1644815 (issue date: Aug. 3, 2016)

SUMMARY

The disclosure is directed to a defect inspection system using a three-dimensional (3D) measuring machine, which can improve a yield of devices by accurately measuring and analyzing the devices using a 3D measuring machine.

According to an aspect of the disclosure, there is provided a defect inspection system using a 3D measuring machine.

The defect inspection system using a 3D measuring machine may include a conveying part disposed between a loading part and an unloading part and holding and transferring a device, a 2D measuring machine facing the conveying part and generating a 2D image of the device, a 3D measuring machine facing the conveying part in a row with the 2D measuring machine and generating a 3D image of the device, and a processor aligning and merging the 3D image and the 2D image to generate a device image and determining a defect of the device on the basis of the device image.

The 3D measuring machine may include a time of flight (TOF) measuring part measuring a shape by measuring a diffraction time of an infrared (IR) laser, an optical triangulation measuring part measuring the shape according to a relative position of a received beam of the IR laser, and a structured light measuring part measuring the shape using a reflected image after structured light is emitted, and the processor may perform control such that at least one among the TOF measuring part, the optical triangulation measuring part, and the structured light measuring part is driven depending on a characteristic value of the device according to a reading result of the 2D image.

The processor may include an image pre-processing part correcting the device image, an image selection part selecting and calling a design image corresponding to the device image on the basis of pre-stored device design information, and a defect determination part comparing and contrasting the device image with the design image.

The defect determination part may determine whether the device is defective according to different specification errors for each element in at least two or more elements extracted from the device image, and the element may be at least one among a device, a pattern, a lead, a die shape, a location, a width, a thickness, a connection, surface roughness, and the presence or absence of foreign materials.

The defect determination part may determine a tolerance range of the specification error by a deep learning method.

The defect determination may readjust the tolerance range of the specification error in a reference time part by a deep learning method.

The defect determination part may select a vulnerable quality factor from the different elements by a deep learning method and assign a weight value to the element.

BRIEF DESCRIPTION OF THE DRAWINGS

The above and other objects, features and advantages of the disclosure will become more apparent to those skilled in the art by describing embodiments thereof in detail with reference to the accompanying drawings, in which.

DETAILED DESCRIPTION OF THE EMBODIMENTS

Figure 1:
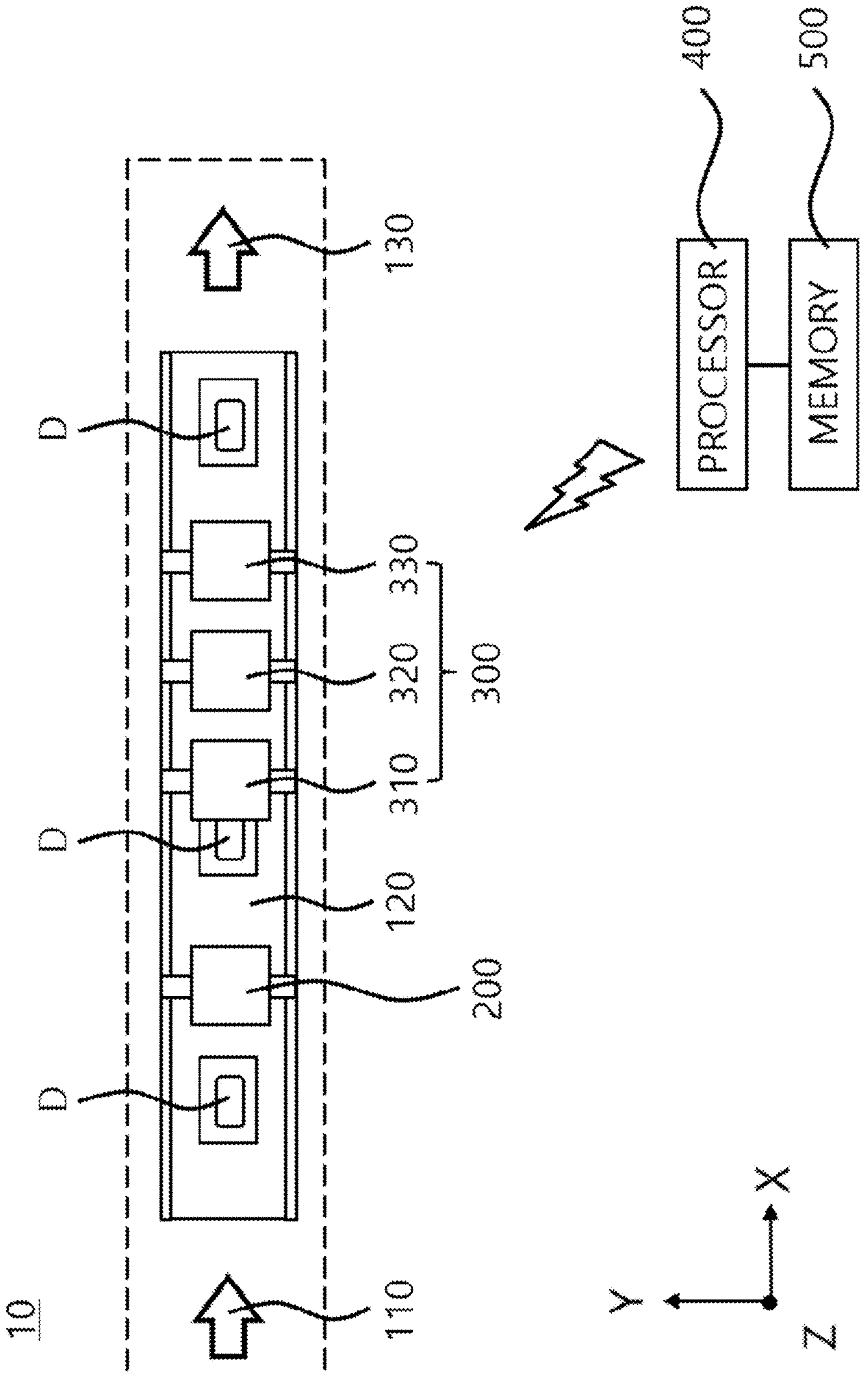
FIG. 1 is a schematic plan view illustrating a defect inspection system using a three-dimensional (3D) measuring machine according to an embodiment of the disclosure.

Hereinafter, embodiments of the disclosure will be described in detail with reference to the accompanying drawings. However, the disclosure is not limited to the embodiments disclosed herein and may be implemented in other forms. The embodiments disclosed herein will be provided to make this disclosure thorough and complete, and will fully convey the spirit of the disclosure to those skilled in the art.

In the specification, when a component is referred to as being on another component, the component may be directly formed on another component or there may be a third component interposed between the component and another component. Further, in the drawings, thicknesses and sizes are exaggerated to effectively describe technical contents.

Furthermore, while the terms “first,” “second,” “third,” and the like are used to describe various components in various embodiments of the disclosure, these components should not be limited by these terms. These terms are used only to distinguish one component from another component. Therefore, a first component referred to in any one embodiment may be referred to as a second component in another embodiment. Each embodiment described herein also includes a complementary embodiment. Further, in the specification, the term “and/or” is used to mean at least one of the components listed before and after it.

The terminology used herein is for the purpose of describing particular embodiments and is not intended to be limiting. As used herein, the singular forms, “a,” “an,” and “the” are intended to include the plural forms as well, unless the context clearly indicates otherwise. Moreover, the terms “comprises,” “comprising,” “includes,” and/or “including,” when used in this specification, specify the presence of stated features, integers, steps, operations, elements, components, and/or groups thereof, but do not preclude the presence or addition of one or more other features, integers, steps, operations, elements, components, and/or groups thereof.

In the specification, it is noted that, as used herein, the terms “substantially,” “about,” and other similar terms, are used as terms of approximation and not as terms of degree, and, as such, are utilized to account for inherent deviations in measured, calculated, and/or provided values that would be recognized by one of ordinary skill in the art. Furthermore, in the specification, the term “connection” is used to describe both indirect and direct connection of a plurality of components.

In the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

Moreover, in the following description of the disclosure, if a detailed description of related known configurations or functions is determined to unnecessarily obscure the gist of the disclosure, the detailed description thereof will be omitted.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Figure 2:
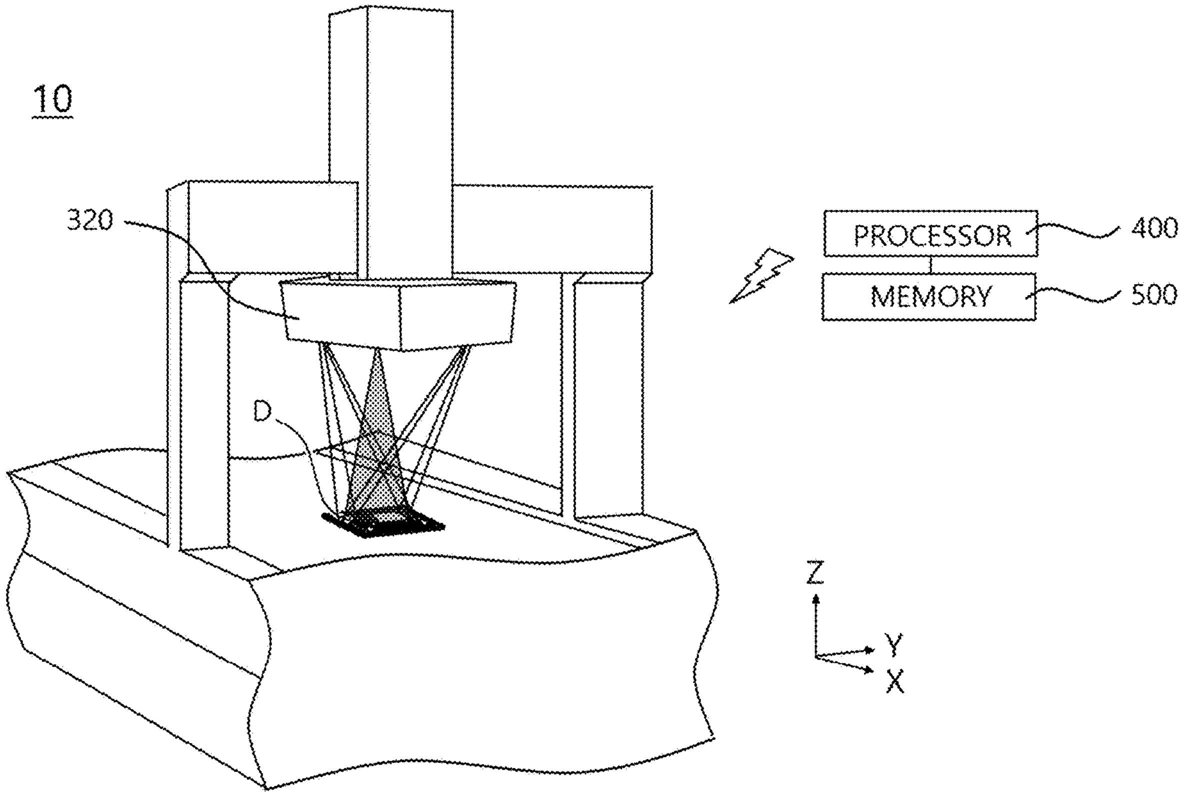
FIG. 2 is a schematic perspective view illustrating an optical triangulation measuring part according to an embodiment of the disclosure.
Figure 3:
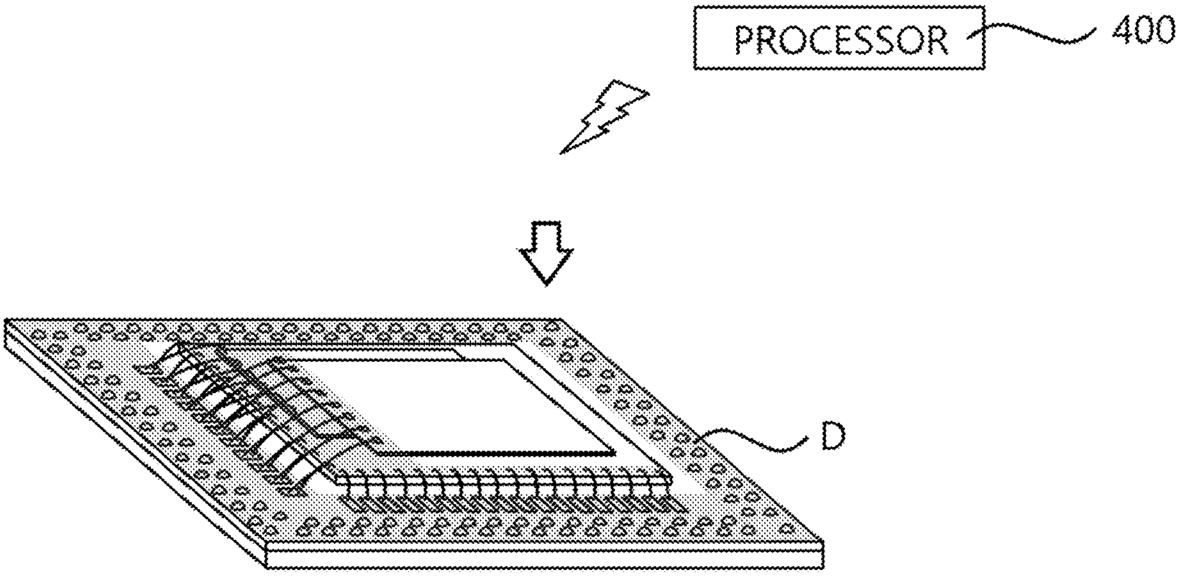
FIG. 3 is a schematic diagram illustrating that a processor generates a 3D image by controlling driving of the optical triangulation measuring part according to a characteristic value of a device according to an embodiment of the disclosure.
Figure 4:
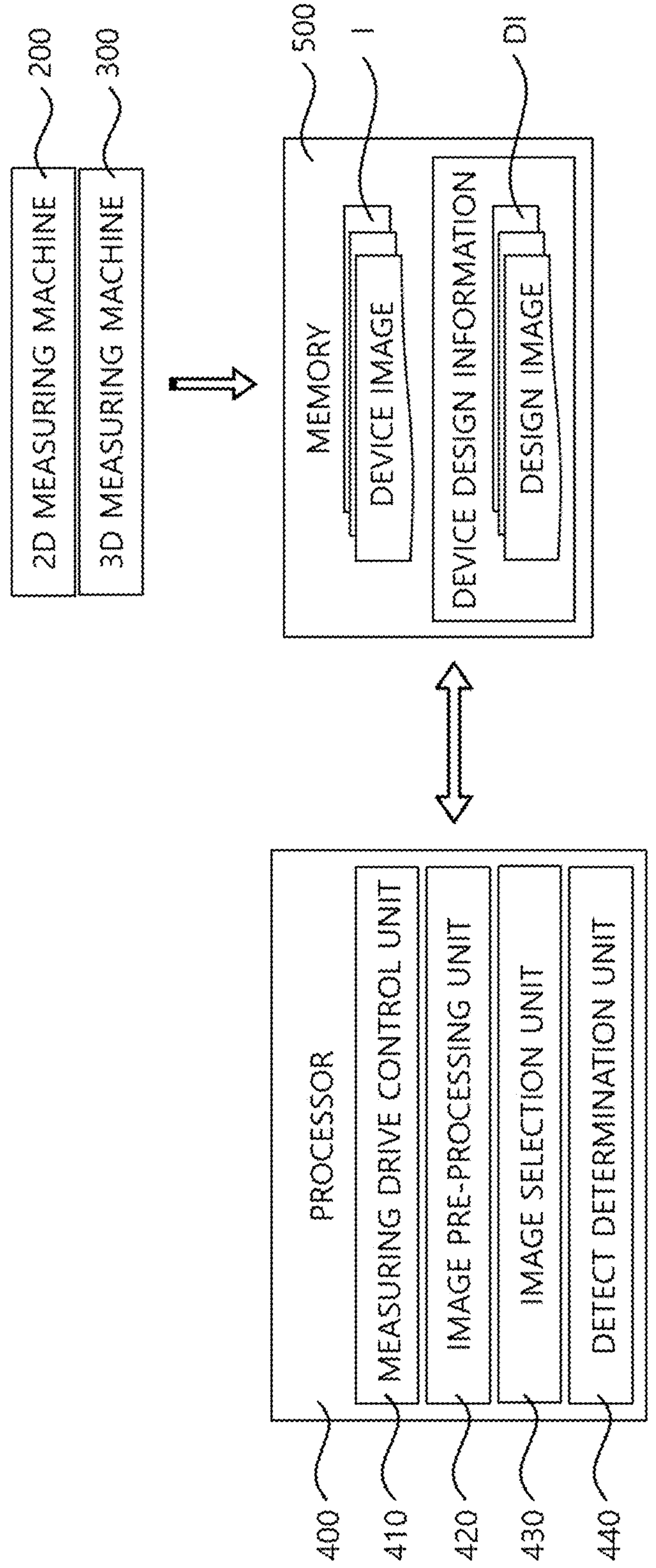
FIG. 4 is a diagram schematically illustrating a correlation between a 2D measuring machine and the 3D measuring machine, the processor, and a memory according to an embodiment of the disclosure.

FIG. 1 is a schematic plan view illustrating a defect inspection system 10 using a three-dimensional (3D) measuring machine according to an embodiment of the disclosure, FIG. 2 is a schematic perspective view illustrating an optical triangulation measuring part 320 according to an embodiment of the disclosure, FIG. 3 is a schematic diagram illustrating that a processor 400 generates a 3D image by controlling driving of the optical triangulation measuring part 320 according to a characteristic value of a device according to an embodiment of the disclosure, and FIG. 4 is a diagram schematically illustrating a correlation between a 2D measuring machine 200 and a 3D measuring machine 300, a processor 400, and a memory 500 according to an embodiment of the disclosure.

Hereinafter, each component constituting the defect inspection system 10 using a 3D measuring machine according to an embodiment of the disclosure will be described in detail.

Referring to FIGS. 1 to 4, the defect inspection system 10 using a 3D measuring machine may belong to a post-process including packaging and testing after designing and manufacturing processes in a manufacturing process of a device D including semiconductors. In order to secure accuracy of performance evaluation of the device D, the defect inspection system 10 using a 3D measuring machine may determine whether the device D is defective by performing line connection and packaging inspection on the device D, prior to a final test or simultaneously with the final test.

The defect inspection system 10 using a 3D measuring machine includes a loading part 110, a conveying part 120, an unloading part 130, the 2D measuring machine 200, the 3D measuring machine 300, and the processor 400 and may further include the memory 500.

Referring to FIG. 1 again, the loading part 110 may include a loader (not shown) for loading the device D.

Referring to FIG. 1 again, the conveying part 120 may be provided in a row with the loading part 110 and the unloading part 130. The conveying part 120 may be disposed between the loading part 110 and the unloading part 130. The device D may be loaded on the conveying part 120 in order for the device D to be conveyed along an arbitrary path.

Referring to FIG. 1 again, the unloading part 130 may include an unloader (not shown) for unloading the device D.

Referring to FIGS. 1 and 4 again, the 2D measuring machine 200 may be provided to face the conveying part 120.

The 2D measuring machine 200 may generate a 2D image of the device D. The device D may be moved along the conveying part 120 and may be positioned parallel to the 2D measuring machine 200. The 2D measuring machine 200 may acquire a 2D shape image through an image processing technology. The 2D measuring machine 200 may calculate a width value and coordinate values in horizontal and vertical directions of the device D. The 2D measuring machine 200 may operate in a non-contact manner.

The image generated by the 2D measuring machine 200 may be stored in the memory 500 which will be described below.

Referring to FIGS. 1 to 4 again, the 3D measuring machine 300 may be provided to face the conveying part 120. The 3D measuring machine 300 may be provided to face the conveying part 120 in a row therewith. The device D may be moved along the conveying part 120 and may be positioned parallel to the 3D measuring machine 300.

The 3D measuring machine 300 may generate a 3D image of the device D. The 3D measuring machine 300 may acquire a 3D shape image through an image processing technology. The 3D measuring machine 300 may calculate a width, a length, and a height of the device D in an orthogonal coordinate system as well as an area and a volume thereof through various calculation techniques such as filter processing, threshold processing, and shadow area minimization processing. The 3D measuring machine 300 according to an embodiment may measure a shape according to a shape definition including straight lines, curves, edges, and holes.

The 3D measuring machine 300 may operate in a non-contact manner. The 3D measuring machine 300 may include a time of flight (TOF) measuring part 310, an optical triangulation measuring part 320, and a structured light measuring part 330.

The image acquired from the 3D measuring machine 300 may be stored in the memory 500.

The TOF measuring part 310 may measure a diffraction time of an infrared (IR) laser to measure a shape of the device D in a 3D manner. The TOF measuring part 310 may include an IR laser and a diffraction optical device.

Again, as shown in FIG. 2, the optical triangulation measuring part 320 may measure the shape of the device D in a 3D manner according to a relative position of a received beam of an IR laser. The optical triangulation measuring part 320 may include an IR laser and a charge-coupled device (CCD) camera for acquiring a profile.

The structured light measuring part 330 may emit structured light, generate a reflected image, and measure the shape of the device D in a 3D manner using a moire pattern. The structured light measuring part 330 may include a CCD camera and a scan head with a projector.

Referring to FIGS. 1 to 4 again, the processor 400 may generate a device image I. The device image I may be generated by aligning and merging different images, that is, a 3D image and a 2D image.

The processor 400 may selectively perform control such that at least one among the TOF measuring part 310, the optical triangulation measuring part 320, and the structured light measuring part 330 is driven depending on a characteristic value of the device D according to a reading result of the 2D image.

The processor 400 may perform defect determination on the device D on the basis of device design information according to the device image I. The processor 400 may perform the defect determination on the device D from elements extracted from the device image I and a measured value for each element. The processor 400 may include a measuring machine drive control part 410, an image pre-processing part 420, an image selection part 430, and a defect determination part 440.

The processor 400 may process a series of data and perform calculation according to an operation of an operating system or an application program. The processor 400 according to an embodiment may be implemented as a central processing part or a system on chip (SoC).

The measuring machine drive control part 410 may perform control such that the 2D measuring machine 200 and the 3D measuring machine 300 are selectively or complementarily driven. The measuring machine drive control part 410 may control whether to operate the 2D measuring machine 200 and the 3D measuring machine 300 on the basis of device characteristic values such as complexity per unit area, uniformity, and flatness.

The measuring machine drive control part 410 according to an embodiment may extract shape information such as density per unit area and shadow generation from the 2D image acquired by the 2D measuring machine 200 and perform control such that one of the 3D measuring machines 300 is selectively driven.

The image pre-processing part 420 may correct numerical values from the device image I and correct the acquired device image I to facilitate semiconductor defect inspection. A processing criterion in the image pre-processing part 420 may be based on processing content of pre-processed device images I. The image pre-processing part 420 may correct a portion of the device image I according to at least one among white balance, shading, horizontal adjustment, and magnification adjustment from the device image.

The image pre-processing part 420 according to an embodiment may selectively correct the device image I according to a location or position of the device D. The image pre-processing part 420 may set a reference height between elements appearing in the device image I and perform shading on elements having different heights on the basis of the reference height. The image pre-processing part 420 may perform direction correction in a horizontal or vertical direction on an XYZ orthogonal coordinate system.

The image pre-processing part 420 may update appearance information on the device image I stored in the memory 500.

The image selection part 430 may compare and select the device design information from the device image I. The image selection part 430 may determine whether each element constituting the device D is good or bad on the basis of inspection information of the device design information.

According to an embodiment, the image selection part 430 may extract one or more elements and a measured value for each element from the device image I. For example, in case that a lead which is one element on the device D is inspected using the inspection information, the image selection part 430 may extract a shape, a location, a width, and a thickness of the lead, a separation distance between leads, and whether other elements are connected (e.g., electrically connected, physically connected).

The element may be a feature point distinguished from other elements on the device D. The element may include a device, a pattern, a lead, a die, a line shape, a location, a width, a thickness, a connection, surface roughness, and the presence or absence of foreign materials, but the disclosure is not limited thereto. The pattern may be one or more features mounted on the device D.

According to an embodiment, the image selection part 430 may contrast, compare, and determine a measured element value and a design value corresponding thereto with the device design information and the design image.

The image selection part 430 may have access authority to the memory 500. The image selection part 430 may call the pre-stored device design information from the memory 500. The image selection part 430 may match each element to the design information and the design images DI as comparison groups.

The comparison and contrast method according to the image selection part 430 may employ iterative learning on the basis of a deep learning model.

The defect determination part 440 may perform defect determination of the device D on the basis of the device image I. The defect determination part 440 may compare and contrast the device image I, the design information, and the design image DI.

The defect determination part 440 may determine whether the device D is defective according to different specification errors for each element. The defect determination part 440 may specify a different weight value for each element. The weight value for each element may be set by an operator or may be calculated on the basis of extracted values accumulated by a deep learning method.

The defect determination part 440 according to an embodiment may determine a tolerance range of the specification error by a deep learning method.

The defect determination part 440 according to an embodiment may readjust the tolerance range of the specification error in a reference time unit on the basis of data accumulated for a reference time by the deep learning method.

According to an embodiment, for a specific component mounted on the device D, the element may be a component. In case that a design value for a component thickness is about 10 μm, a specification error range for the design value may be set to a range from about 7 μm to about 13 μm. A preset specification error may be adjusted on the basis of accumulated thickness information of the device D for a time interval (e.g., a predetermined or selectable time interval). For example, it is possible to adjust an error range within the range from about 9 μm to about 11 μm on the basis of the accumulated thickness information calculated from the image information on the device D.

The defect determination part 440 according to an embodiment may apply different weight values to two or more elements. The defect determination part 440 may select a vulnerable quality factor from different elements by a deep learning method. For example, the defect determination part 440 may calculate a standard deviation within a tolerance range from accumulated data for a specific element by the deep learning method. The defect determination part 440 may assign a weight value to a corresponding element in a reference time unit.

Referring to FIG. 1 again, the memory 500 may store various pieces of device design information and various design images DI for each type of the device D and each characteristic. The memory 500 may store the device images I generated by the 2D measuring machine 200 and the 3D measuring machine 300. The memory 500 may be electrically connected to the 2D measuring machine 200 and the 3D measuring machine 300 to receive device images. The memory 500 may be electrically connected to the processor 400 to transmit and receive semiconductor design information, design images DI, device images I, and predetermined correction processed device images I.

The device design information may include information related to manufacturing of the device D. The device design information may include specification information, appearance information, and inspection information on a plurality of elements mounted on a substrate constituting the device D. The specification information, the appearance information, and the inspection information on each element may be linked and stored in the memory 500. The device design information may be modified or updated by an operator externally importing or inputting product information for different elements or by a deep learning method.

The appearance information may include information on a semiconductor appearance, such as a height, an area, a volume, a location, a number, an interval, and text of each element.

The inspection information may be information used to inspect mounting conditions for a plurality of elements. The inspection information may be determined on the basis of the appearance information.

The memory 500 according to an embodiment may include a built-in memory or an external memory. The built-in memory may include a volatile memory such as a dynamic random access memory (DRAM), a static RAM (SRAM), or a synchronous DRAM (SDRAM), or a non-volatile memory such as a flash memory, a hard drive, or a solid state drive (SSD). The external memory may be functionally connected to the 2D measuring machine 200, the 3D measuring machine 300, or the processor 400 through various interfaces.

According to embodiments of the disclosure, a processor 400 can perform control such that a 3D measuring machine and a 2D measuring machine are selectively driven so that there is an advantage of reducing a load required when an image for device defect determination is generated and increasing accuracy of the device defect determination.

According to one embodiment of the disclosure, in order to complement high power consumption and overload of the 3D measuring machine, the processor 400 can selectively drive the 3D measuring machine to generate a 3D image with a focus on an element providing a decisive diagnosis of a defect according to device characteristics so that there is an advantage being able to improve effectiveness of the defect determination and defect determination efficiency.

According to another embodiment of the disclosure, the processor 400 can selectively drive different 3D measuring machines so that there is an advantage of complementarily supplementing disadvantages of different 3D measuring machines.

According to another embodiment of the disclosure, a defect determination unit of the processor 400 can adjust a tolerance error range and a weight value differently for each element by a deep learning method so that there is an advantage of improving performance efficiency of a defect inspection system.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A defect inspection system using a three-dimensional (3D) measuring machine, comprising:

a conveying part disposed between a loading part and an unloading part and holding and transferring a device;

a 2D measuring machine facing the conveying part and generating a 2D image of the device;

a 3D measuring machine facing the conveying part in a row with the 2D measuring machine and generating a 3D image of the device;

a processor aligning and merging the 3D image and the 2D image to generate a device image and determining a defect of the device on the basis of the device image; and a memory 500 providing various pieces of device design information and various design image stored by each type and each characteristic of the device to the processor, and receiving and storing the device image from the processor.

2. The defect inspection system of claim 1, wherein the processor is electrically connected to the memory and corrects the device image on an element-by-element basis using the device design information and the design image.

3. The defect inspection system of claim 1, wherein the processor includes a measuring machine drive control part controlling an operation of the 2D measuring machine and the 3D measuring machine using device characteristic values such as complexity, uniformity, and flatness per unit area.

* * * * *